United States Patent [19]

Liu

[11] Patent Number: 5,520,963
[45] Date of Patent: May 28, 1996

[54] PAINT FORMULATION

[75] Inventor: Tong Z. Liu, Scarborough, Canada

[73] Assignee: DuPont Canada, Inc., Mississauga, Canada

[21] Appl. No.: 269,089

[22] Filed: Jun. 30, 1994

[51] Int. Cl.$^6$ ....................................................... B05D 1/02
[52] U.S. Cl. ............................ 427/421; 106/179; 106/196
[58] Field of Search ............................. 427/421; 106/196, 106/179

[56] References Cited

U.S. PATENT DOCUMENTS 4,588,787   5/1986   Kordomenos et al. ................. 525/440

*Primary Examiner*—Shrive Beck
*Assistant Examiner*—David M. Maiorana

[57] ABSTRACT

This invention relates to a coating composition having a low concentration of cellulose acetate butyrate so as to minimize the formation of defects in the coating when dried and particularly relates to a urethane paint for spraying having cellulose acetate butyrate with a concentration between 0.1 and 2% by weight of the total solids in the ready-to-spray paint. A method of spraying an article with urethane paint is also described which comprises the steps of: adding cellulose acetate butyrate to urethane paint, and spraying an article, where the concentration of cellulose acetate butyrate is selected to have a concentration between 0.1 to 2.0% by weight of the total solids in said paint ready for spraying.

17 Claims, 1 Drawing Sheet

Typical CAB Properties

| Type | Viscosity | Acetyl% | Butryl% |
|---|---|---|---|
| CAB 381-0.1 | 0.1 | 13.5 | 38 |
| CAB 381-0.5 | 0.5 | 13.5 | 38 |
| CAB 381-2 | 2 | 13.5 | 38 |
| CAB 381-2BP | 2.2 | 14.5 | 35.5 |
| CAB 381-20 | 20 | 13.5 | 37 |
| CAB 381-20BP | 16 | 15.5 | 35.5 |
| CAB 321-0.1 | 0.1 | 18.5 | 31.2 |

FIGURE 1

PAINT FORMULATION

FIELD OF INVENTION

This invention relates to coating compositions having improved appearance and particularly relates to urethane paint compositions having low concentrations of cellulose acetate butyrate (CAB) by weight of the total solids in said paint.

BACKGROUND OF INVENTION

Many articles and particularly vehicles are painted so as to improve the appearance as well as protect same from corrosion. These vehicles are generally spray painted to quickly and efficiently apply the paint to the body of the vehicle.

Such paint is applied onto the body of the vehicle during the original equipment manufacture (O.E.M.) where the paint is baked on. However paint is also required to be sprayed when the vehicle requires auto body repair, or to refinish same.

A variety of paints and paint formulations have heretofore been utilized in finishing articles and particularly finishing or refinishing automobile bodies, including urethane paints which are utilized to refinish vehicle bodies.

For example, U.S. Pat. No. 3,832,217 relates to a process for forming exterior finish coating films for automotive bodies which utilize a thermosetting resin and includes the use of CAB in melamine formulated paints that are baked in O.E.M. applications. Moreover, other O.E.M. baking systems that include CAB in paints having melamine formulations are examined in Polym. Paint Col. J. 1979, vol. 169 No. 4010, 986. The CAB mentioned in the above identified prior art is used to control the metallic flake orientation.

Finally, Japanese patent No. 88-327509/46 teaches the formation of coating with metallic lustre with the addition of CAB in a resin having an acid number under 10.

It is not uncommon for defects in the form of craters or mounds to develop on the surface of paints, and particularly on the surface of urethane paints, during the course of drying. Craters or dimples are depressions which visually form on the surface or film of the paint during drying. Mounds, on the other hand, are visible protrusions or hills which form on the surface or film of the paint during drying. Such defects often develop on the surface of medium to high solids two-component urethane paints whether clearcoat or single stage. Medium to high solids two-component urethane paints generally have a solids content of between 40% to 70% solids by weight when ready to spray. In other words the volatiles will have a weight content of 60% to 30% respectively. The volatiles will evaporate. The solid content or level is measured as defined in ASTM 2369.

It is an object of this invention to minimize the formation of craters or mounds on the surface of said paint, and particularly to minimize the formation of those defects on the surface of sprayed urethane paint by adding a low concentration of CAB.

It is another object of this invention to provide for an improved method of spraying urethane paints so as to minimize the formation of surface defects during drying.

The broadest aspect of this invention relates to a coating composition having a concentration of cellulose acetate butyrate of between 0.1% and 2.0% by weight of cellulose acetate butyrate to the total weight of solids in said coating, said cellulose acetate butyrate having a viscosity equal to or greater than 0.5 seconds, and less than 20 seconds so as to minimize the formation of craters and mounds on the surface of the coating when dried at ambient temperature.

Another aspect of this invention relates to a urethane paint for spraying said pain having a concentration of cellulose acetate butyrate of between 0.1% and 2.0% by weight of cellulose acetate butyrate to the total weight of solids in said ready-to-spray paint, said cellulose acetate butyrate having a butyryl content of approximately 38% and acetyl content of approximately 13.5%, and having a viscosity equal to or greater than 0.5 seconds, and less than or equal to 2 seconds so as to minimize the formation of craters and mounds on the surface of said paint when dried at ambient temperature.

Yet another aspect of this invention relates to the method of spraying an article with urethane paint comprising the steps of: adding cellulose acetate butyrate to said urethane paint; said cellulose acetate butyrate having a viscosity equal to or greater than 0.5 seconds and less than 20 seconds; spraying said article; drying said sprayed article at ambient temperatures; where said cellulose acetate butyrate is selected to have a concentration between 0.1 and 2.0% by weight of the total weight of solids in said paint ready for spraying.

BRIEF DESCRIPTION OF DRAWINGS

FIG. 1 is a chart illustrating typical CAB properties.

DESCRIPTION OF INVENTION

Urethane paints are used to coat a variety of articles, including the refinishing of vehicles.

Urethane paint can either be clearcoat (no pigment or colour) or single-stage top coat (with pigment). A urethane clearcoat is applied on top of a base coat (also referred to as colour coat) so as to present an upper most layer. When sprayed onto articles, and particularly vehicles, surface defects in the form of craters or mounds can develop within twenty to forty minutes after such paint has been sprayed and the paint is in the course of drying at ambient temperatures. Such defects often develop on the surface of medium to high solids two-component urethane paints whether clearcoat in a clearcoat/colour coat finish or single-stage top coat (also referred to as monocoat).

In refinishing applications for vehicles a two-component urethane paint may be utilized. A two-component urethane paint consists of:

1) component 1—contains hydroxyl-functional (—OH) resins 2) component 2—contains isocyanate (—NCO) resins.

These two components are supplied in two separate containers. At the time of spraying the paint, the two components are mixed in a desired ratio where the hydroxyl-functional resin reacts with the isocyanate-functional resin to form urethane paint. The isocyanate used in these applications can be a trimer of hexamethylene diisocyanate resin. Alternatively, component two can contain any of the isocyanate cross linkers commonly used in the paint industry. Usually a third container is supplied together with the first two containers or components.

The third container contains solvent so as to permit the painter a choice of different speeds of solvents to be used to make up the final ready-to-spray mixture according to different temperatures in a manner well known to persons skilled in the art. For example a painter may prefer a slower evaporating solvent in hot weather and a faster evaporating solvent in cold weather.

Adding CAB into the paint, and particularly into two-component urethane paint so as to produce a low concentration of CAB to the total solids in the ready-to-spray mixture minimizes or greatly reduces surface defects in the form of craters and mounds which develop after such paint has been sprayed and the paint is in the course of drying at ambient temperature.

Particularly good results have been observed by adding CAB to the urethane paint so that the paint contains CAB concentrations between 0.1 to 2.0% by weight of the total solids in the ready-to-spray mixture.

The CAB or cellulose acetate butyrate has a CAS# (Chemical Abstract Service) 009004-36-8. By way of example, FIG. 1 shows some typical CAB properties for types of CAB as designated by Eastman Chemical Product Co. Particularly good results were obtained by utilizing CAB 381-0.5. This specific CAB has an acetyl content of 13.5%, butyryl content of approximately 38% and viscosity of one-half second. CAB viscosity measurement is defined by ASTM E-817.

Other good results in minimizing the formation of the above identified defects were obtained by utilizing a low concentration of CAB 381-20 (having a viscosity of 20 seconds). A low concentration of CAB 381-0.1 could also be utilized. Moreover, it should be understood that this invention is not limited to utilizing CAB 381, but other CAB which also minimize the formation of surface defects.

CAB is part of the ready-to-spray paint composition by adding a CAB solution into the paint pre-dissolved in an organic solvent mixture which is later added to the urethane paint. For example the CAB may be pre-dissolved in the following typical solvent mixture:

| | |
|---|---|
| ethyl acetate | 25% |
| PM acetate | 30% (propylene glycol monomethyl ether acetate) |
| xylene | 25% |
| CAB | 20% |

This CAB solution as illustrated above is added into the paint, for example the first component referred to above, during the normal manufacturing process by mixing.

In the following examples the present invention will be explained in more detail. However these examples should not be considered to limit the invention.

EXAMPLE 1

This example relates to the use of CAB, for the purpose of minimizing the dried paint surface defects in forms of craters and/or mounds, in a two-component urethane clearcoat. This urethane clearcoat comprises a mixture of DuPont's products code number 8500S (component 1) and 8525S (component 2).

Component 1 (8500S) contains a hydroxyl (—OH) functional acrylic resin (38% of the total 8500S formula weight) with an acid number of between 13 and 17; CAB 381-0.5 (0.2% of the total 8500S formula); two silicone flow agents, a light stabilizer, a UV-absorber, and a catalyst (the combined weight of these five ingredients is under 1% of the total 8500S formula weight), and a organic solvent mixture (61% of the total 8500S formula weight, comprising of typical organic solvents, e.g. butyl acetate, ethyl acetate, propylene glycol monomethyl ether acetate, propylene glycol monomethyl ether, primary amyl acetate, toluene, xylene, and aromatic hydrocarbons, etc.).

In this example the CAB is added into component 1 during the manufacturing process in the DuPont factory.

Component 2 (8525S) contains an isocyanate (—NCO) functional resin. The isocyanate resin comprises 72% of the total 8525S formula weight. The remainder is xylene.

A third container which contains only an organic solvent mixture, DuPont product code number 8570S, supplies additional solvents to be mixed into the mixture of component 1 and component 2.

At the time of spraying of this urethane clearcoat, the above-mentioned three items, ie. 8500S, 8525S, and 8570S, were mixed in the ratio of 8, 2, 1 by volume so as to produce the following ready-to-spray mixture: a —OH functional acrylic resin (27% of the total ready-to-spray mixture formula weight); a —NCO functional resin (14% of the total ready-to-spray mixture weight); CAB 381-0.5 (less than 0.2% of the total ready-to-spray mixture weight); two silicone flow agents, a light stabilizer, a UV absorber, and a catalyst (the combined weight of these five ingredients is under 1% of the total ready-to-spray mixture formula weight); and an organic solvent mixture (58% of the total ready-to-spray mixture formula weight, comprising of typical organic solvents, e.g. butyl acetate, ethyl acetate, propylene glycol monomethyl ether acetate, propylene glycol monomethyl ether, primary amy acetate, toluene, xylene, and aromatic hydrocarbons, etc.). The total solid content of this ready-to-spray mixture is 42% by weight. The CAB 381-0.5 content is 0.3% of the total solid content of this ready-to-spray mixture by weight. This ready-to-spray mixture is referred to as RTS mixture-1.

A control urethane clearcoat ready-to-spray mixture (hereafter referred to as RTS mixture-2) is produced in a similar manner and content as RTS mixture-1, except that RTS mixture-2 does not contain any CAB. These two RTS mixtures were sprayed side-by-side onto two properly prepared test panels respectively. The spray application was carried out by using a spray gun commonly used in the trade, at a pressure of 55 lbs. per square inch at the gun. Two coats of this urethane clearcoat were sprayed onto the test panel, with a flash time of 10 minutes between the first and second coat applications. After the second coat spray was completed, these two test panels were dried side by side at ambient temperature. After the urethane clearcoat was substantially dried (usually after a couple of hours), the two panels were examined. The panel coated with RTS mixture-1 showed substantially less defects in the form of craters and/or mounds compared to the panel coated with RTS mixture-2.

EXAMPLE 2

This example relates to the use of CAB 381-0.5, for the purpose of minimizing dried paint surface defects in forms of craters and/or mounds, in a two-component urethane single-stage black topcoat.

In this example, component 1 contains three hydroxyl (—OH) functional acrylic resins, a pigment (carbon black; however, other organic, inorganic, and metallic pigments could be used, depending on the colour of the vehicle or vehicle parts to be sprayed), two silicone flow agents, a light stabilizer, a UV-absorber, a catalyst, and an organic solvent mixture. Prior to spraying, component 1 is mixed with component 2 (containing isocyanate functional resins) and additional solvent supplied in a third container in the ratio of 3, 1, 1 by volume to produce a mixture. A small amount of CAB 381-0.5, supplied in a solvent mixture with 6% CAB 381-0.5 content, such as for example 5% of the total mixture weight is added to the mixture to produce the ready-to-spray mixture. This ready-to-spray mixture contains the following ingredients: three —OH functional acrylic resins (26% of the total ready-to-spray mixture formula weight); —NCO functional resin (13% of the total ready-to-spray mixture formula weight); CAB 381-0.5 (0.3% of the total ready-to-spray mixture formula weight); two silicone flow agents, a light stabilizer, a UV-absorber, a catalyst (the combined weight of these five ingredients is under 1% of the total ready-to-spray mixture formula weight); and an organic solvent mixture (58% of the total ready-to-spray mixture formula weight, comprising of typical organic solvents, e.g. butyl acetate, ethyl acetate, methyl ethyl ketone, methyl amyl ketone, ethylene glycol monobutyl ether, propylene glycol monomethyl ether acetate, primary amy acetate, and xylene). The total solid content of this ready-to-spray mixture is 42% by weight. The CAB 381-0.5 content is 0.7% of the total solid content of this ready-to-spray mixture by formula weight.

In both of the examples referred to above, the final dried paint surface had far fewer defects in the form of craters or mounds compared to the same urethane paint without any CAB.

The embodiments of the invention in which an exclusive property or privilege is claimed are defined as follows:

1. A coating composition having a concentration of cellulose acetate butyrate of between 0.1% and 2.0% by weight of cellulose acetate butyrate to the total weight of solids in said coating, said cellulose acetate butyrate having a viscosity equal to or greater than 0.5 seconds, and less than 20 seconds so as to minimize the formation of craters and mounds on the surface of the coating when dried at ambient temperature.

2. A coating composition as claimed in claim 1 wherein said coating composition comprises urethane paint.

3. A coating composition as claimed in claim 2 wherein said cellulose acetate butyrate has a butyryl content of approximately 38% and acetyl content of approximately 13.5%.

4. A coating composition as claimed in claim 3 wherein said urethane paint is comprised of medium to high solids two-component urethane paint having a solids content of 40% to 70%.

5. A coating composition as claimed in claim 3 wherein said urethane paint includes acrylic resins.

6. A urethane paint for spraying said paint having a concentration of cellulose acetate butyrate of between 0.1% and 2.0% by weight of cellulose acetate butyrate to the total weight of solids in said ready-to-spray paint, said cellulose acetate butyrate having a butryl content of approximately 38% and acetyl content of approximately 13.5%, and having a viscosity equal to or greater than 0.5 second, and less than or equal to 2 seconds so as to minimize the formation of craters and mounds on the surface of said paint when dried at ambient temperature.

7. A urethane paint as claimed in claim 6 wherein said urethane paint comprises a two-component urethane paint.

8. A urethane paint as claimed in claim 7 wherein said cellulose acetate butyrate has a viscosity of one-half second.

9. A urethane paint as claimed in claim 8 wherein said cellulose acetate butyrate has a concentration of about 0.3% by weight.

10. A urethane paint as claimed in claim 9 wherein said urethane paint comprises a two-component urethane clearcoat for spraying vehicles.

11. A urethane paint as claimed in claim 9 wherein said urethane paint comprises a two-component urethane single-stage paint having a colour pigment for spraying vehicles.

12. The method of spraying an article with urethane paint comprising the steps of:
(a) adding cellulose acetate to said urethane paint; said cellulose acetate butyrate having a viscosity equal to or greater than 0.5 seconds and less than 20 seconds;
(b) spraying said article
(c) drying said sprayed article at ambient temperatures where said cellulose acetate butyrate is selected to have a concentration between 0.1 and 2.0% by weight of the total weight of solids in said paint ready for spraying.

13. The method as claimed in claim 12 wherein said urethane paint is a two-component urethane paint and is produced by mixing a hydroxyl-functional resin with isocyanate resins.

14. The method as claimed in claim 13 wherein organic solvents are added to said mixture of hydroxyl-functional resins and isocyanate resins.

15. The method as claimed in claim 14 wherein said cellulose acetate butyrate is first added to said organic solvents and then mixed with said hydroxyl-functional resins.

16. The method as claimed in claim 15 wherein said cellulose acetate butyrate is selected with a butyryl content of approximately 38%, acetyl content of approximately 13.5%.

17. The method as claimed in claim 16 wherein said cellulose acetate butyrate as selected to have a concentration of 0.3% by weight of cellulose acetate butyrate in the total solids of the urethane paint as ready-to-spray and thereby produce a paint surface dried at ambient temperatures substantially free of craters and mounds.

* * * * *